United States Patent
Perrella

(10) Patent No.: US 7,996,763 B2
(45) Date of Patent: Aug. 9, 2011

(54) GENERATING METRICS ON DATA REPRESENTATIONS

(75) Inventor: Ronald Julien Perrella, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 820 days.

(21) Appl. No.: 11/548,437

(22) Filed: Oct. 11, 2006

(65) Prior Publication Data

US 2008/0091404 A1 Apr. 17, 2008

(51) Int. Cl.
*G06F 7/60* (2006.01)
(52) U.S. Cl. .......................... 715/234; 703/22
(58) Field of Classification Search .................. 715/234, 715/513, 514, 515; 703/22
See application file for complete search history.

(56) References Cited

U.S. PATENT DOCUMENTS

| | | | |
|---|---|---|---|
| 2005/0004891 A1* | 1/2005 | Mahoney et al. | 707/3 |
| 2006/0190830 A1* | 8/2006 | Gerstl et al. | 715/757 |
| 2006/0282765 A1* | 12/2006 | Hintermeister et al. | 715/513 |
| 2007/0220486 A1* | 9/2007 | Lammel et al. | 717/114 |

OTHER PUBLICATIONS

Qureshi, M.H.; Samadzadeh, M.H.; "Determining the complexity of XML documents" International Conference on Information Technology: Coding and Computing, 2005. ITCC 2005, Apr. 2005, vol. 2, pp. 416-421.*
McCabe, T.J., "A Complexity Measure" IEEE Transactions on Software Engineering, Dec. 1976, IEEE, vol. SE-2, pp. 308-320.*
Segoufin, Luc, "Typing and querying XML documents: some complexity bounds" Proceedings of the twenty-second ACM SIGMOD-SIGACT-SIGART symposium on Principles of database systems, 2003, ACM, pp. 167-168.*
Power, James F.; Malloy, Brian A.; "A metrics suite for grammar-based software" Journal of Software Maintenance & Evolution: Research & Practice, Nov. 1, 2004. vol. 16,Iss.6;p. 405-426.*
Lammel, Ralf; Kitsis, Stan; Remy Dave, "An Analysis of XML schema usage" XML '05 (Conference Proceedings of XML 2005), Nov. 2005, pp. 1-38.*
Warren A. Harrison and Kenneth I. Magel. "A complexity measure based on nesting level" SIGPLAN Not., 1981, ACM, vol. 16, Issue 3 , p. 63-74.*
Paul Piwowarski, "A nesting level complexity measure" SIGPLAN Not., 1982, ACM, vol. 17 Issue 9, p. 44-50.*
Tegarden, D., Sheetz, S. and Monarchi, D.; "A software complexity model of object-oriented systems" Decision Support Systems, 1995, vol. 13, issue 3-4, pp. 241-262.*

* cited by examiner

*Primary Examiner* — Adam L Basehoar
*Assistant Examiner* — Michael Scott
(74) *Attorney, Agent, or Firm* — Thomas, Kayden, Horstemeyer & Risley, LLP

(57) ABSTRACT

One embodiment of the present disclosure is a method for assessing complexity levels in data representations. Such a method can be broadly summarized by the following: obtaining a first document having information associated with a data representation being used to model a concept and at least a second document having information associated with a data representation being used to model the same concept; analyzing structural components of the first document and the second document to assess a level of complexity in the data representation associated with each of the first and the second documents; and determining which of the data representation of the first document and the data representation of the second document has a smaller level of complexity. Other methods and systems are also provided.

15 Claims, 16 Drawing Sheets

| | NESTING LEVEL | NESTING VALUE | OBJECT VALUE | SCORE |
|---|---|---|---|---|
| 210 310 `<note>` | 1 | 1 | 2 | (1 x 2) = 2 |
| 410 `<date>` | 2 | 2 | 2 | 2 + (2 x 2) = 6 |
| 420 `<day>` | 3 | 2 | 2 | 6 + (2 x 2) = 10 |
| 430 `<month>` | 3 | 2 | 2 | 10 + (2 x 2) = 14 |
| 230 `<year>` | 3 | 2 | 2 | 14 + (2 x 2) = 18 |
| 240 `<to>` | 2 | 2 | 1 | 18 + (2 x 1) = 20 |
| 250 `<from>` | 2 | 2 | 2 | 20 + (2 x 2) = 24 |
| 260 `<heading>` | 2 | 2 | 1 | 24 + (2 x 1) = 26 |
| `<body>` | 2 | 2 | 3 | 26 + (2 x 3) = 32 |

Figure 3:
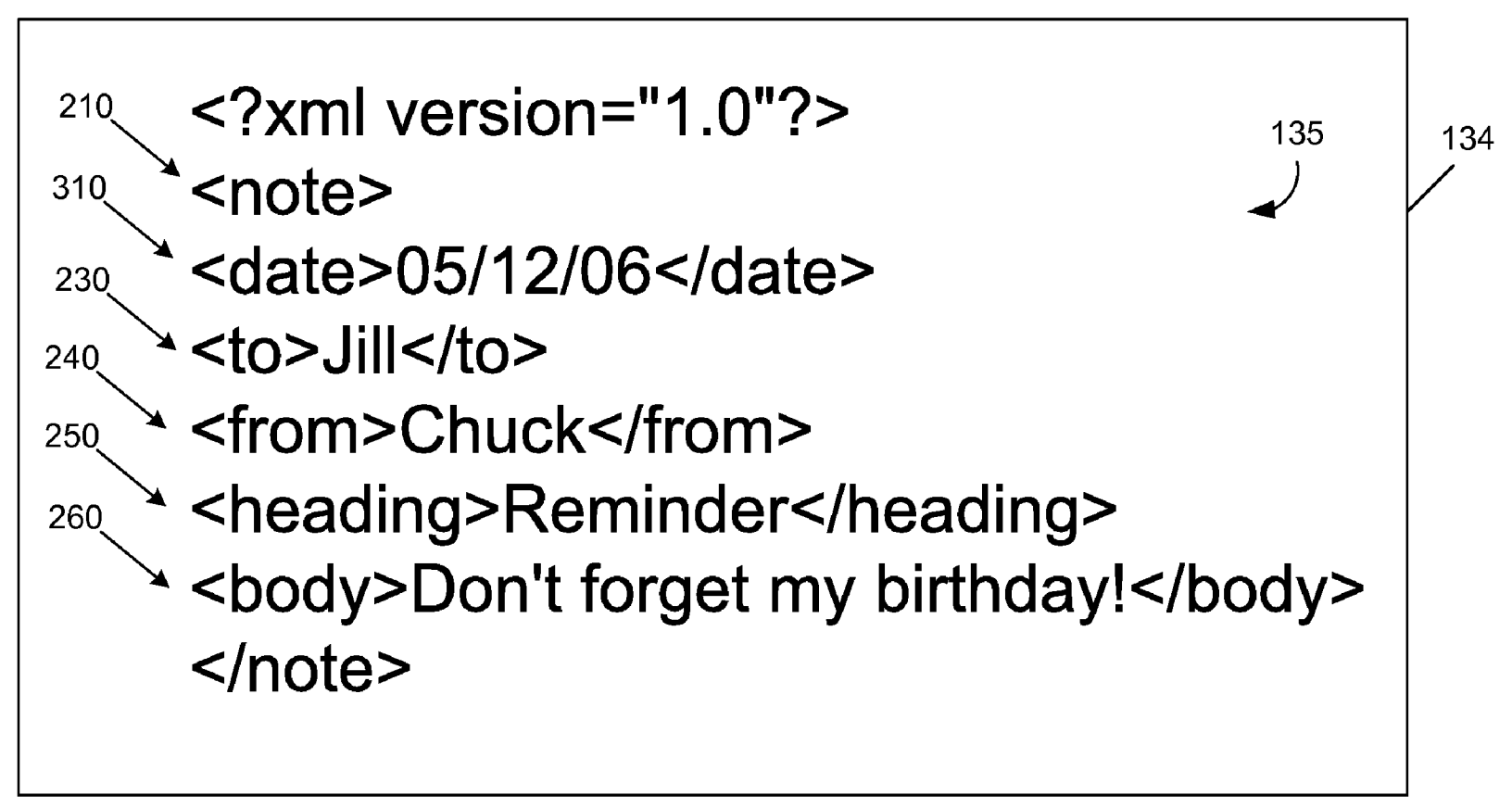

```
<?xml version="1.0"?>
<note>
<date>05/12/06</date>
<to>Jill</to>
<from>Chuck</from>
<heading>Reminder</heading>
<body>Don't forget my birthday!</body>
</note>
```

```
<?xml version="1.0"?>       ← 210
<note>                      ← 310
<date>                      ← 410
<day>12</day>               ← 420
<month>05</month>           ← 430
<year>06</year>
</date>                     ← 230
<to>Jill</to>               ← 240
<from>Chuck</from>          ← 250
<heading>Reminder</heading>
<body>Don't forget my birthday!</body>  ← 260
</note>
```

| OBJECT | VALUE |
|---|---|
| ELEMENTS | |
| BODY | 3 |
| FROM | 2 |
| HEADING | 1 |
| NOTE | 2 |
| TO | 1 |
| ... | |
| ATTRIBUTES | |
| DATE | 1 |
| ... | |

FIG. 5

|  | NESTING LEVEL | NESTING VALUE | OBJECT VALUE | SCORE |
|---|---|---|---|---|
| 210 → <note> | 1 | 1 | 2 | (1 x 2) = 2 |
| 310 → <date> | 2 | 2 | 2 | 2 + (2 x 2) = 6 |
| 230 → <to> | 2 | 2 | 1 | 6 + (2 x 1) = 8 |
| 240 → <from> | 2 | 2 | 2 | 8 + (2 x 2) = 12 |
| 250 → <heading> | 2 | 2 | 1 | 12 + (2 x 1) = 14 |
| 260 → <body> | 2 | 2 | 3 | 14 + (2 x 3) = 20 |

FIG. 8

|  | NESTING LEVEL | NESTING VALUE | OBJECT VALUE | SCORE |
|---|---|---|---|---|
| 210 <note> | 1 | 1 | 2 | (1 x 2) = 2 |
| 310 <date> | 2 | 2 | 2 | 2 + (2 x 2) = 6 |
| 410 <day> | 3 | 2 | 2 | 6 + (2 x 2) = 10 |
| 420 <month> | 3 | 2 | 2 | 10 + (2 x 2) = 14 |
| 430 <year> | 3 | 2 | 2 | 14 + (2 x 2) = 18 |
| 230 <to> | 2 | 2 | 1 | 18 + (2 x 1) = 20 |
| 240 <from> | 2 | 2 | 2 | 20 + (2 x 2) = 24 |
| 250 <heading> | 2 | 2 | 1 | 24 + (2 x 1) = 26 |
| 260 <body> | 2 | 2 | 3 | 26 + (2 x 3) = 32 |

FIG. 9

```
<!ELEMENT note (to, from, heading, body)>
<!ELEMENT to (#PCDATA)>
<!ELEMENT from (#PCDATA)>
<!ELEMENT heading (#PCDATA)>
<!ELEMENT body (#PCDATA)>
```

FIG. 11

```
<?xml version="1.0"?>
<!DOCTYPE note SYSTEM
"http://www.X.com/dtd/note.dtd">
<note>
<to>Jill</to>
<from>Chuck</from>
<heading>Reminder</heading>
<body>Don't forget my birthday!</body>
</note>
```

```
<?xml version="1.0"?>
<xs:schema xmlns:xs="http://www.X.org/2001/XMLSchema"
targetNamespace="http://www.X.com"
xmlns="http://www.X.com"
elementFormDefault="qualified">
<xs:element name="note">
 <xs:complexType>
  <xs:sequence>
   <xs:element name="to" type="xs:string"/>
   <xs:element name="from" type="xs:string"/>
   <xs:element name="heading" type="xs:string"/>
   <xs:element name="body" type="xs:string"/>
  </xs:sequence>
 </xs:complexType>
</xs:element>
</xs:schema>
```

1310

```
<?xml version="1.0"?>
<note
xmlns="http://www.X.com"
xmlns:xsi="http://www.X/2001/XMLSchema-instance"
xsi:schemaLocation="http://www.X.com note.xsd">      1410

<to>Jill</to>
<from>Chuck</from>
<heading>Reminder</heading>
<body>Don't forget my birthday!</body>
</note>
```

FIG. 14

GENERATING METRICS ON DATA REPRESENTATIONS

TECHNICAL FIELD

The present disclosure is generally related to computer systems and, more particularly, is related to evaluating computer data.

BACKGROUND

XML (Extensible Markup Language) is a system for defining specialized markup languages that are used to transmit formatted data. XML may be used to express mathematical equations, e-commerce transactions, object meta-data, server applications, and a variety of other types of structured information. Generally, XML and similar languages provide a flexible architecture for representing objects in a notation that defines object types and hierarchical relationships of objects. However, a particular XML file may contain a large number of objects and corresponding relationship and/or definition information associated with the objects.

There are a lot of different ways of expressing the same idea in XML. An XML file that expresses an idea or object in a simpler manner than another XML file that expresses the same idea or object is generally easier to maintain, use, and modify. Further, an XML representation might express a concept or an internal software representation that is more or less "expensive" from a computational or storage basis. Some elements of the representation may have a higher "cost" in time, space, complexity, etc. Also, a combination of elements in a hierarchy could result in different ultimate "costs" based upon the combination as a whole. Such a determination of these costs and related metrics would be beneficial but is hard to obtain.

Thus, a heretofore unaddressed need exists in the industry to address the aforementioned deficiencies and inadequacies.

SUMMARY

Embodiments of the present disclosure provide systems and methods for assessing complexity levels of one or more data representations. Briefly described, one embodiment of the system, among others, includes an evaluator module configured to obtain at least one document having information associated with a data representation being used to model at least one concept. The evaluator module is further configured to analyze structural components of the at least one document to assess a level of complexity in the data representation of the document. The system further includes a storage medium having at least one table of values used to quantify a level of complexity for each of the structural components of the document, wherein the evaluator module aggregates the complexity levels of the structural components to determine the complexity level for the data representation of the document.

Embodiments of the present disclosure can also be viewed as providing methods for assessing complexity levels of data representations. In this regard, one embodiment of such a method, among others, can be broadly summarized by the following: obtaining a first document having information associated with a data representation being used to model a concept and at least a second document having information associated with a data representation being used to model the same concept; analyzing structural components of the first document and the second document to assess a level of complexity in the data representation associated with each of the first and the second documents; and determining which of the data representation of the first document and the data representation of the second document has a smaller level of complexity.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2-4 are diagrams of three exemplary XML documents containing exactly the same information in three different data representations to illustrate functionality of the system of FIG. 1.

FIG. 5 is a diagram of an exemplary version of an object table in accordance with the system of FIG. 1.

FIG. 8 is a diagram illustrating an exemplary approach for computing a complexity score for the document illustrated in FIG. 3.

FIG. 9 is a diagram illustrating an exemplary approach for computing a complexity score for the document illustrated in FIG. 4.

FIG. 11 is a diagram of an exemplary version of a Document Type Definition file in accordance with the system of FIG. 1.

FIG. 12 is a diagram of an exemplary version of the document from FIG. 2 making reference to the DTD file of FIG. 11.

FIG. 13 is a diagram of an exemplary version of a XML Schema Definition (XSD) file in accordance with the system of FIG. 1.

FIG. 14 is a diagram of an exemplary version of the document from FIG. 2 making reference to the XSD file of FIG. 13.

DETAILED DESCRIPTION

Figure 1:
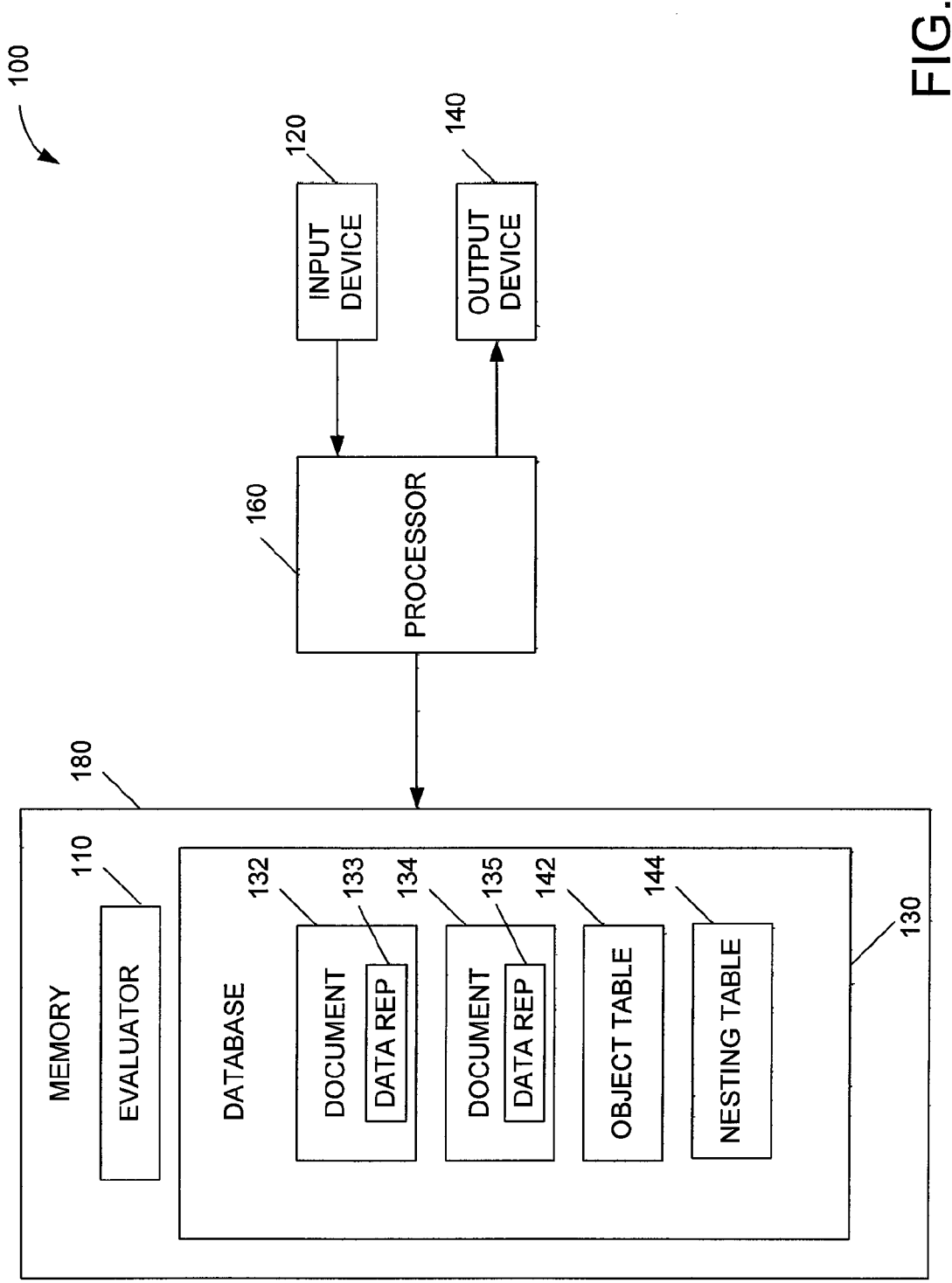
FIG. 1 is a block diagram illustrating an embodiment of a data representation assessment system in accordance with one embodiment of the present disclosure.

FIG. 1 is a diagram illustrating an embodiment of a data representation assessment system 100 in accordance with one embodiment of the present disclosure. Briefly, the data representation assessment system 100 assesses data representations of an object using a modeling language, such as, but not limited to, XML.

For example, there may be two XML documents or files that describe a network facility. Each document describes the same facility by defining the syntax for a relationship between various objects of the facility. However, one document may have less complex structure than another document.

Using an embodiment of the data representation assessment system 100, two pieces of data representations, such as the two XML documents, may be assessed and a determination made as to which piece of data is less complex than the other. This is used to assess the complexity of the data representation rather than the particulars of a program code.

For example, a less complex structure may have a beneficial impact on runtime by a computer that is processing the document. Also, it may have a beneficial impact on memory utilization of the computer. For example, a highly complex XML model expressed in a document becomes a highly complex memory representation of XML which can impact performance and memory consumption of a computer system. Also, a complex XML model may cause a complex algorithm to be devised to process the complex XML model, whereas a simpler XML model may result in a simpler algorithm to be written.

As such, an XML representation might express a concept or an internal software representation that is more or less "expensive" from a computational or storage basis. Some elements of the representation may have a higher "cost" in time, space, complexity, etc. Also, a combination of elements in a hierarchy could result in different ultimate "costs" based upon the combination as a whole. For example, an XML representation could represent the assembly of parts that make up a complex device such as a car. The aggregate "cost" could provide an estimate as to the construction cost of the device, not just the cost of the parts themselves. Accordingly, a particular sequence of XML elements may introduce a unique cost (e.g., the cost in setting up/running an assembly line for that sequence). A different sequence of the same XML elements may have a different cost associated with the XML representation.

In the illustrated embodiment of FIG. 1, the data representation assessment system 100 comprises an input device 120, an output device 140, a processor 160, and a memory 180 of a computer system, such as a personal computer (PC; IBM-compatible, Apple-compatible, or otherwise), workstation, minicomputer, or mainframe computer.

The input device 120 may comprise a keyboard, keypad, pointing device, such as a mouse or a track pad, or other type of device for inputting information into the data representation assessment system 100. The output device 140 may comprise a monitor, display, printer, or other type of device for generating an output.

The present disclosure also encompasses computer software that may be executed by the processor 160. In the illustrated embodiment, the memory 180 comprises an evaluator 110, which is a computer software program. However, it should be understood that the system 100 and, specifically, the evaluator 110, may be configured using hardware, software, or a combination of hardware and software components. In the embodiment of FIG. 1, the evaluator 110 is illustrated as being stored in the memory 180, where the evaluator 110 may be executed by the processor 160. However, the evaluator 110 may be otherwise stored, including remotely stored, as to be accessible by the processor 160.

In the illustrated embodiment, the data representation assessment system 100 also comprises a database 130 stored in the memory 180. In one embodiment, the database 130 comprises information associated with assessing the complexity of at least one document. For example, in the illustrated embodiment, the data representation assessment system 100 may be used to assess the complexity of two extensible markup language (XML) documents 132, 134 that each contain a data representation ("data rep") 133, 135 of an electronic message. It is noted that embodiments of the present disclosure are not limited to the foregoing example and may be used with documents having data representations in a variety of modeling languages for a variety of subjects. For example, it should be understood that other types of devices or information may be expressed as an XML data model such as, but not limited to, an integrated circuit architecture or name and address information stored in a database.

In the illustrated embodiment, the data representation assessment system 100 also comprises an object table 142 and a nesting table 144 stored in the database 130. The tables 142, 144 comprise information associated with the XML documents 132, 134 for assessing the complexity of a particular data representation 133, 135 contained in each of the documents 132, 134. For example, in this embodiment, the object table 142 comprises values associated with structural components or objects used in data representations, such as elements and attributes contained in an XML document. For each object in the object table 142, a value is assigned to the object. Therefore, when the evaluator 110 assesses the complexity of the data representation 133, 135 in each of the documents 132, 134 and locates an object in the documents 132, 134, the evaluator 110 looks up the object in the object table 142 and associates a value found in the table 142 with the object. This value is used in determining a complexity score for the data representation, as is discussed below.

Also, the nesting table 144 comprises values associated with nesting levels used in data representations or in other words, levels of dependencies or subordination. In a data representation, an object may be expressed as a child of another object or parent object. The child object may also be referred as being subordinate to the parent object, being dependent to the parent object, or being nested within the parent object. In the present example, if an object is not subordinate to any other object, it is regarded as being at a top nesting level of the document or Level 1. If an object is subordinate to a parent object and the parent object is not subordinate to any other object, then the object (which is the child of the parent object) is regarded as being at a second nesting level of the document or Level 2. Likewise, if a "first object" is a child to a parent object and the parent object is actually the child of another object (which is not subordinate to any other objects), then the first object is at a third nesting level or Level 3 within the data representation. For each nesting level in the nesting table 144, a value is assigned to the nesting level. Therefore, when the evaluator 110 assesses the complexity of the data representation 133, 135 in each of the documents 132, 134 and locates an object in the documents 132, 134, the evaluator 110 determines the nesting level for the object and looks up the nesting level in the nesting table 144 and associates a value found in the table 144 with the nesting level. This value is used in determining a complexity score for the data representation, as is discussed further below. The complexity score is a quantification of a level of complexity for a data representation structure.

By using tables having values indicative of complexity factors in data representations, a complexity assessment may be made of data representations. For example, in the present example, complexity of data representations are increased as certain characteristics, such as the number of objects and nesting levels are present in the data representation. Also, values assigned to one object or nesting level may be significantly higher or lower than the values assigned to another object or nesting level. These values can be tailored for a particular application, as needed.

Figure 2:

FIGS. 2-4 are of three XML documents 132, 134, 136 containing exactly the same information in three different data representations 133, 135, 405. A date attribute is used in the first document 132, a date element is used in the second document 134, and an expanded date element is used in the third document 136.

In the data representation 133 in FIG. 2, a message is represented by an XML model. The same message is also represented by the XML document 134 shown in FIG. 3.

To assess the complexity of the two data representations 133, 135 of the same message in FIGS. 2-3, the evaluator 110 application first parses the XML document 132 in FIG. 2 and locates the objects used in the data representation 133 of the XML document 132. In XML, objects include elements and attributes. In the example of FIG. 2, a note object or element 210 is the first object that is located, and it is at a top nesting level.

In accordance with the object table 142, an example version of which is shown in FIG. 5 for the present example, the note element 210 has a value 540 associated with it of 2. This value is going to be used to determine a complexity score for the data representation 133 shown in FIG. 2, as discussed hereafter.

Figure 6:
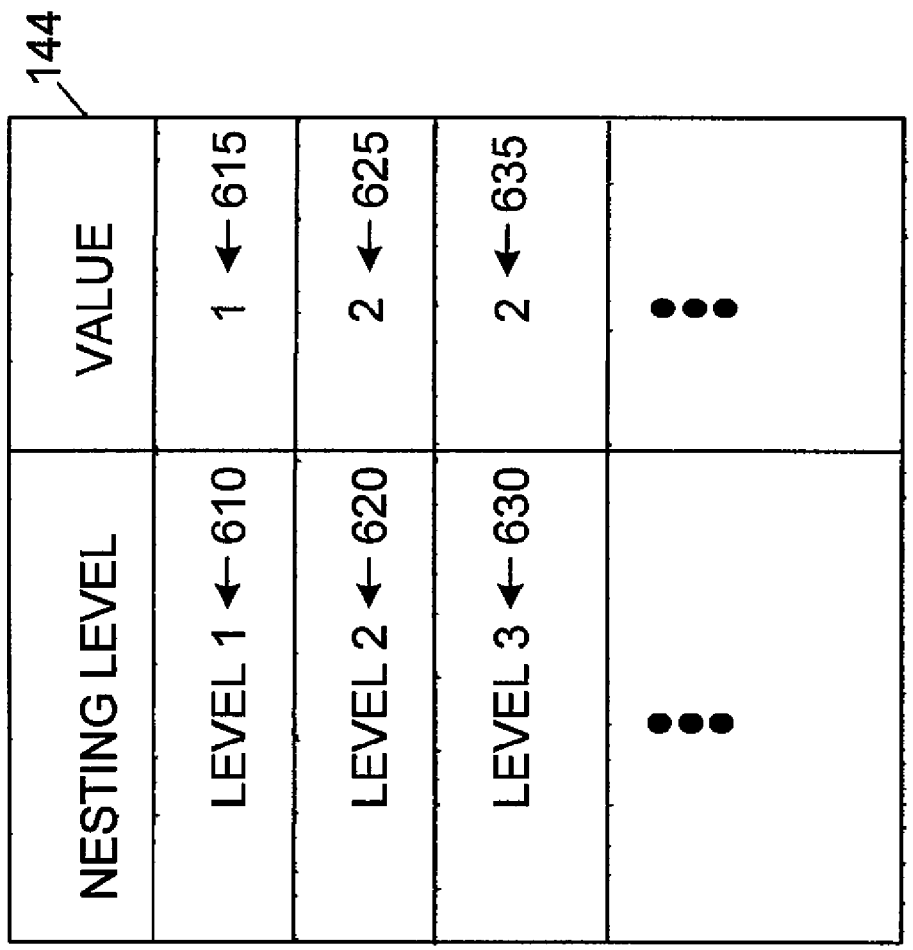
FIG. 6 is a diagram of an exemplary version of a nesting table in accordance with the system of FIG. 1.
Figure 7:
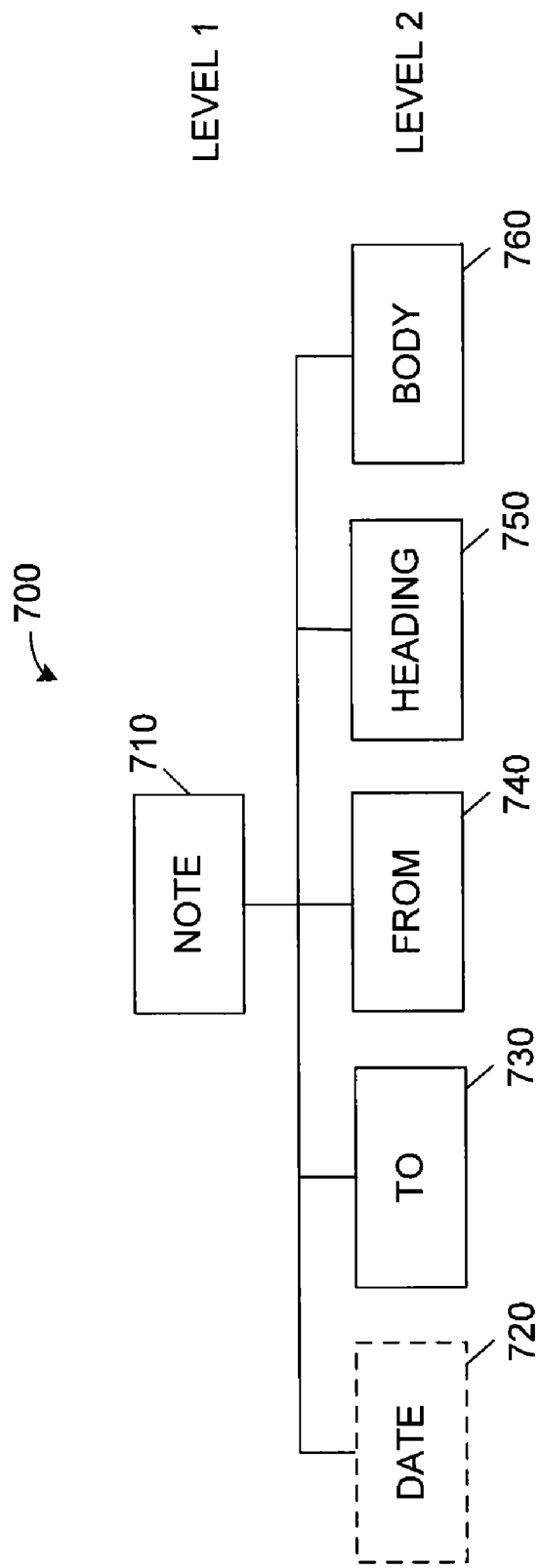
FIG. 7 is a tree diagram of the document illustrated in FIG. 2.

For each object located in the XML document 132, a nesting level is determined from the nesting table 144. For example, the note element 210, 710 of the XML document 132 is at a top nesting level or Level 1 610. Therefore, by looking at the nesting table 144, an example version of which is shown in FIG. 6, a value (615) of 1 is associated with Level 1 nesting level 610. To further illustrate the concept of nesting levels, a tree diagram 700 for the XML document 132 of FIG. 2 showing the various nesting levels is shown in FIG. 7, where the note element 210, 710 of the XML document 132 is shown at Level 1 and a date attribute 220, 720, a to element 230, 730, a from element 240, 740, a heading element 250, 750, and a body element 260, 760 of the XML document 132 are shown at Level 2.

In determining the complexity score, each value of each object in the data representation is factored against (e.g., multiplied with) the value of the nesting level for that object and summed with the respective calculations of other objects and their nesting levels.

Calculation of the complexity score for the present example will be shown in stages for each object obtained. For the first object obtained (the note element 210), the evaluator 110 determines the current complexity score to be 1×2=2, where "1" is the value 615 of Level 1 610 from the nesting table 144 and "2" is the value 510 of the note element 210 from the object table 142.

Also, the note element 210 has a date attribute 220 associated with the note element 210. Attributes, such as the date attribute 220, may also impact the complexity score. In looking at the object table 142, it is noted that the date attribute 220 has a value 520 of 1. In looking at the tree diagram 700 in FIG. 7, it is noted that the date attribute 220, 720 is at nesting level of 2 ("Level 2") and this has a value 625 of 2 in the nesting table 144 of FIG. 6.

Also, the note element 210, 710 has an attribute associated with it. This date attribute 220, 720 may also impact the complexity score. In looking at the object table 142, it is noted that the date attribute 220, 720 has a value 520 of 1. In looking at the tree diagram 700 in FIG. 7, it is noted that the date attribute 220, 720 is at nesting level of 2 ("Level 2") and this has a value 625 of 2 in the nesting table of FIG. 6.

Therefore, the current complexity score is 2+(2×1)=4, where the first "2" is the calculation for the prior object (i.e., the note element 210); the second "2" is the value 625 of the nesting Level 2 620 associated with the date attribute 220 in table 144 of FIG. 6; and the "1" is the value 520 associated with the date attribute 220 in table 142 of FIG. 5.

The next object obtained by the evaluator 110 is the to element 230. It is noted that the to element 230 is located within the start and end tags for the note element 210 and is considered a child of the note element 210. Accordingly, the to element 230, 730 is at a Level 2 nesting level, as indicated by FIG. 7.

By looking at the object table 142 of FIG. 5 and the nesting table 144 of FIG. 6, it is determined that the to element 230 has an object value 530 of 1 and a nesting factor or value 625 of 2.

Therefore, the current complexity score is 4+(2×1)=6, where "4" is the calculation for the prior objects and their nesting levels (i.e., the note element 210 and the data attribute 220); "2" is the value 625 of Level 2 620 associated with the to element 230 in the nesting table 144; and "1" is the value 530 of the to element 230 in the object table 142.

Similarly, for the from element 240, the evaluator 110 computes the current complexity score to be 6+(2×2)=10, where "6" is the calculation for the prior objects and their nesting levels (i.e., the note element 210, the data attribute 220, and the to element 230); the first "2" is the value 625 of nesting Level 2 620; and the second "2" is the value 540 of the from object 240.

Similarly, for the heading element 250, the value 625 of the nesting Level 2 620 associated with the heading element 250 is 2, and the object value 550 of the heading element is 1. For the body element 260, the value 625 for the nesting Level 2 620 associated with the body element 260 is 2, and the object value 560 of the body element 260 is 3. These are all the objects found in the data representation 133 of FIG. 2.

Thus, the total complexity score for this data representation 133 is 10+(2×1)+(2×3)=18, where 10 is the calculation of prior objects and their nesting levels (i.e., the note element 210, the data attribute 220, the to element 230, and the from element 240); the (2×1) is the calculation for the heading object 250; and (2×3) is the calculation for the body object 260.

Accordingly, the evaluator 110 also determines a complexity score for the second document 134 of FIG. 3 using the object table 142 and nesting table 144 where the date element is not shown in the object table 142 but assumed to have an assigned value of 2 for the present example. Therefore, the complexity score is computed to be (1×2)+(2×2)+(2×1)+(2×2)+(2×1)+(2×3)=20, as generally depicted in FIG. 8.

In FIG. 8, a manner in which the complexity score is determined for the data representation 135 of FIG. 3 is shown. In particular, FIG. 8 shows the objects listed in the data representation 135 of FIG. 3 with the nesting level of each of the objects from the nesting table 142, the nesting value associated with the nesting level for the nesting table 142, and the value associated with each of the objects from the object table 144. Starting with the first object, a score is calculated by multiplying the object value with the nesting value. The next object's value and nesting value are then multiplied together and this value is added to the prior score for the preceding object. This process continues until all the objects have been considered and the final score is determined, which is 20 in this example.

Therefore, the first representation (which had a complexity score of 18) is considered the less complex representation in this example with regard to the tables 142, 144 used in FIGS. 5 and 6 (since 18 is less than 20). Accordingly, the evaluator 110 displays the results to a user on a computer system.

The evaluator 110 may also compare the complexity of the data representation 133 in FIG. 2 with the data representation 405 of FIG. 4. As described above, the complexity score for the data representation 133 of FIG. 2 is computed to be 18.

Regarding the data representation 405 of FIG. 4, there are three nesting levels. The note element 210 is at a top level which is regarded as nesting Level 1. The date element 310, to element 230, from element 240, heading element 250, and body element 260 are nested within the note element 210 and are regarded as being at nesting Level 2. Further, a day element 410, month element 420, and year element 430 are nested within the date element 310 which is nested within the note element 210. Therefore, the day element 410, month element 420, and year element 430 are regarded as being at nesting Level 3 (630) which has an associated value (635) of 2. Using the values from the tables of FIGS. 5 and 6 (where the date element 310, day element 410, month element 420, and year element 430 are not shown in FIG. 5 but are assumed to have values of 2 respectively for the present example), the complexity score for the data representation 405 of FIG. 4 is determined to be 32, as indicated in FIG. 9, where the score is shown being calculated for each of the elements of the XML data representation 405 of FIG. 4.

Again, the data representation of FIG. 2 (which had a complexity score of 18) is found to be less complex structurally when compared with the data structure of FIG. 4 (which has a score of 32). This determination may be displayed to a user by the evaluator 110, in some embodiments, along with the complexity score(s). Also, in some embodiments, the evaluator 110 is configured to assess the complexity of more than two documents or data representations at a time. In some embodiments, a user may identify a multitude of documents that are to be compared against each other in assessing which document has the lowest complexity score.

As explained previously, nesting levels in data representations is one factor that can be used to determine a complexity score or level of a data representation. For example, the more subordination evident in a data representation generally means the more complex a concept being expressed by the data representation.

Also, attributes, such as the data attribute 220 of the XML document 200, and elements are types of objects used in XML representations and are factors used in determining a complexity score or level in an XML data representation, for one embodiment. XML attributes are normally used to describe XML elements, or to provide additional information about elements. The more attributes an element has, the more complex the element appears and the higher the cost associated with the element, whether in terms of programming complexity, memory power, or processing power.

It is noted that attributes can not generally contain multiple values while elements can in XML representations. Also, attributes are not generally expandable (for future changes) and can not describe structures (like child elements can). Further, attributes are more difficult to manipulate by program code and attribute values are not easy to test against a document type definition (DTD) or other schema, in one embodiment. Thus, there is a cost associated with the use of attributes that is reflected in the value associated with attributes in the object table 142. Therefore, in some implementations, an XML representation with a plentiful amount of attributes may be difficult to maintain and to manipulate by other computer applications.

With regard to data representations in general, the more complex a data representation is, the more work is generally involved in producing a parser for the data representation or the amount of time involved in implementing a solution involving the subject of the data representation. This in turn can affect schedules and project plans in addition to runtime processing of a computer system involved with or working with such data representations.

By doing a summation of the costs of all the levels of nesting and the elements in a data representation, a metric of the complexity value of a document containing the data representation may be computed. The associated costs may be application specific. For example, if a data representation is of a physical plant facility, a "pipe" may be one of the elements featured, but physical piping is not very expensive and therefore does not have a large cost value associated with it. "Boiler" may be another element featured in the data representation of a physical plant facility and may be an expensive item to purchase, so the cost of this element has a high cost value. Therefore, the value of a boiler may be twenty times the value of the pipe for example. In another context or application, the value of the boiler may be 4 times the value of the pipe or less.

Figure 10:
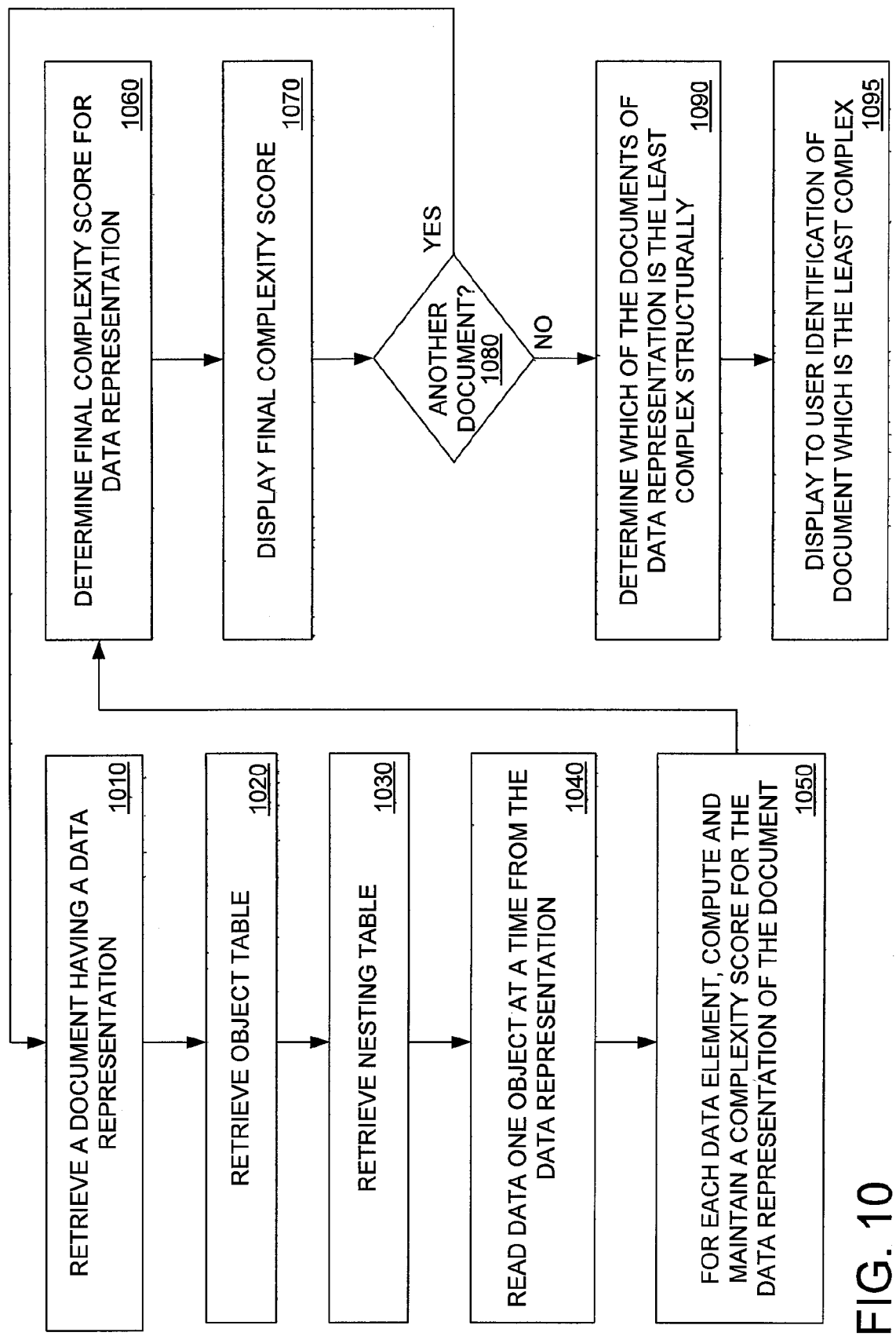
FIG. 10 is a flow chart illustrating an embodiment of a method for determining a complexity score of at least one data representation in accordance with the system of FIG. 1.

FIG. 10 is a flowchart illustrating an embodiment of a method for determining a complexity score of at least one data representation in accordance with the present disclosure. The method begins at step 1010, where the evaluator 110 retrieves one of the documents 132, 134 having data representations 133, 135 from the memory 180. At step 1020, the evaluator 110 retrieves the object table 142 from the database 130. At step 1030, the evaluator 110 retrieves the nesting table 144 from the database 130. In some embodiments, the evaluator 110 may prompt a user to indicate whether new values should be specified for either of the tables 142, 144. In this way, a user can customize standards for complexity of the data representation, if need be.

The evaluator 110 proceeds by reading (1040) data one object at a time from the data representation. For each data element associated with the document 132, the evaluator 110 computes and maintains (1050) a complexity score for the data representation 133 of the document 132. In particular, each element is given a score based upon the type of element and the value assigned to the particular type of element in the object table 142. The nesting level of the element is also tracked. Each time the nesting level increases, the level factor or value is determined by lookup in the nesting table 144. The nesting level factor is multiplied against all elements at that nesting level.

The final complexity score is determined (1060) and is the weighted sum for all the elements in the data representation being evaluated. This complexity score may then be displayed (1070) to a user. Then, another document, such as the document 134, having a data representation 135 with the same subject matter is evaluated (1080) in the same manner as just described. Accordingly, a complexity score for the document may also be displayed (1070). After, all of the complexity scores for all of the documents that are being evaluated have been computed, the evaluator 110 determines (1090) which of the documents of data representation is the least complex structurally. This determination is then displayed (1095) to the user.

As stated above, different values may be assigned to different types of elements or objects utilized in data representations. For example, in XML, text represented by a CDATA element is not parsed by an application reading the data representation, in accordance with an XML standard. Therefore, a CDATA element may be assigned a 0 value in the object table 142 so that its associated complexity is given a low score. In some embodiments, values of attributes may be designated to weigh less than elements.

In some embodiments, a document with a definition for a data structure may be evaluated in lieu of the data representation itself. For example, a data schema for a data representation or model can be evaluated and used to determine a complexity score for the data schema that may be attributed to data representations themselves.

XML Schema Definition (XSD) or W3C (World Wide Web Consortium) XML Schema (WXS) is one way to describe and validate data in an XML environment. Document Type Definition (DTD) is another schema language for XML. Schemas define grammatical rules governing attributes of elements and the valid nesting of the elements and attributes.

FIG. 11 shows an example of a DTD file 1110 called "note.dtd" that defines the elements of the XML document 132 ("note.xml") in FIG. 2. The first line defines the note element 210 to have four child elements: "to, from, heading, body". Lines 2-5 of the DTD file 1110 define the to, from, heading, and body elements 230, 240, 250, and 260 to be of type "#PCDATA". FIG. 12 shows the document 132 from FIG. 2 with a reference 1210 to the DTD file 1110 ("note.dtd") of FIG. 11.

FIG. 13 shows an example of an XML Schema file 1310 called "note.xsd" that defines the elements of the XML document 132 ("note.xml") in FIG. 2. The note element 210 is a complex type because it contains other elements. The other elements (to, from, heading, body) 230, 240, 250, and 260 are simple types because they do not contain other elements. FIG. 14 shows the document 132 of FIG. 2 with a reference 1410 to the XML Schema file 1310 ("note.xsd") of FIG. 13.

Figure 15:
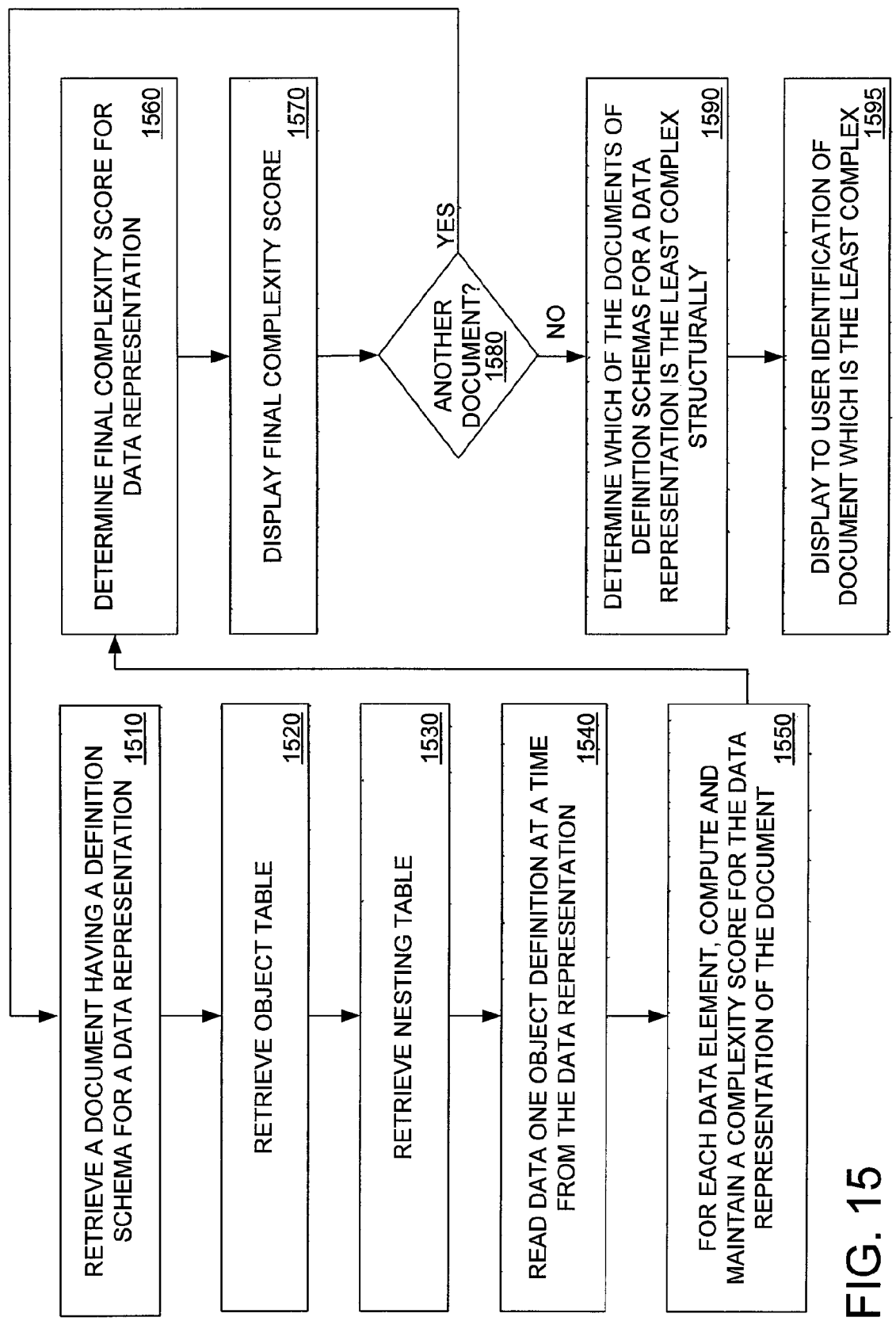
FIG. 15 is a flow chart describing one embodiment of a method for assessing complexity of a data representation in accordance with the system of FIG. 1.

Referring now to FIG. 15, a flow chart describing one embodiment of a method for assessing complexity of a data representation is shown. The method begins at step 1510, where the evaluator 110 retrieves one of the documents 132, 134 having a definition schema for a data representation in the memory 180. For example, the evaluator 110 may retrieve the XML Schema file 1310 from FIG. 13 stored in database 130. At step 1520, the evaluator 110 retrieves the object table 142 from the database 130. At step 1530, the evaluator 110 retrieves the nesting table 144 from the database 130. In some embodiments, the evaluator 110 may prompt a user to indicate whether new values should be specified for either of the tables 142, 144. In this way, a user can customize standards for complexity of the data representation, if need be.

The evaluator 110 proceeds by reading (1540) data—one object definition at a time from the data representation. For each definition of a data element, the evaluator 110 computes and maintains (1550) a complexity score for a data representation that would implement the schema. Each element definition is given a score based upon the type of element and the value assigned to this type of element in the object table 142. The nesting level of the element definition is also tracked. Each time it increases, the level factor or value is determined by lookup in the nesting table 144. The level factor is multiplied against all element definitions at that nesting level.

The final score is determined (1560) and is a weighted sum for all the object definitions in the schema of the data representation being evaluated. This complexity score may be displayed (1570) to a user. Then, another document having a definition schema for another data representation is evaluated (1580) in the same manner as just described. Accordingly, a complexity score for this document may also be displayed (1570). After, all of the complexity scores for all of the documents that are being evaluated have been computed, the evaluator 110 determines (1590) which of the documents of definition schemas that is to be implemented by a data representation is the least complex structurally. This determination is then displayed (1595) to the user.

Therefore, an assessment may be made by examining definition schemas and based on this examination, representations are determined that are likely to be more or less complex than others. Even if an example of a data representation is not available, an assessment of complexity of the schema itself can be automatically made via an embodiment of the evaluator 110 within the data representation assessment system 100.

Unlike previous methods that attempted to validate the correctness of XML data models in terms of syntactical rules, exemplary embodiments are not concerned with testing data representations and attempting to find formatting errors. However, it should be appreciated that testing data representations and attempting to find formatting errors may be used in combination with embodiments described herein. Unlike McCabe's cyclomatic complexity metric, which is described in A Complexity Measure, IEEE Transactions on Software Engineering, Volume 2, No. 4 (December 1976), pp. 308-320, by Tom McCabe, which is incorporated herein by reference in its entirety, where McCabe's cyclomatic complexity looks at program code to see if it was written in such a way that it would be likely to be problematic down the road, exemplary embodiments provide metrics that examine and assess data representations and/or definition schemas for such representations. Data representations of a non-complex structure may be preferred over complex structures for the reasons previously stated. Further, if a particular data representation is complex, than the corresponding program code that reads and processes the particular data representation may also be complex and problematic. In addition, a complex data representation can also cause other problems. Unmanaged complexity leads to software that is difficult to use, maintain, and modify. It also causes increased development costs and overrun schedules.

Program complexity may be assessed by examining data representations that are to be read and processed by such programs. Program complexity can be assessed even before a particular program is written by examining the data representation that is to be processed by the particular program. Complexity of the particular program can be revised to reduce its complexity by reducing the complexity of the data representation itself. The less complex a program is, the less likely it is to have errors and the easier it will be to support, debug or modify the program in the future.

Figure 16:
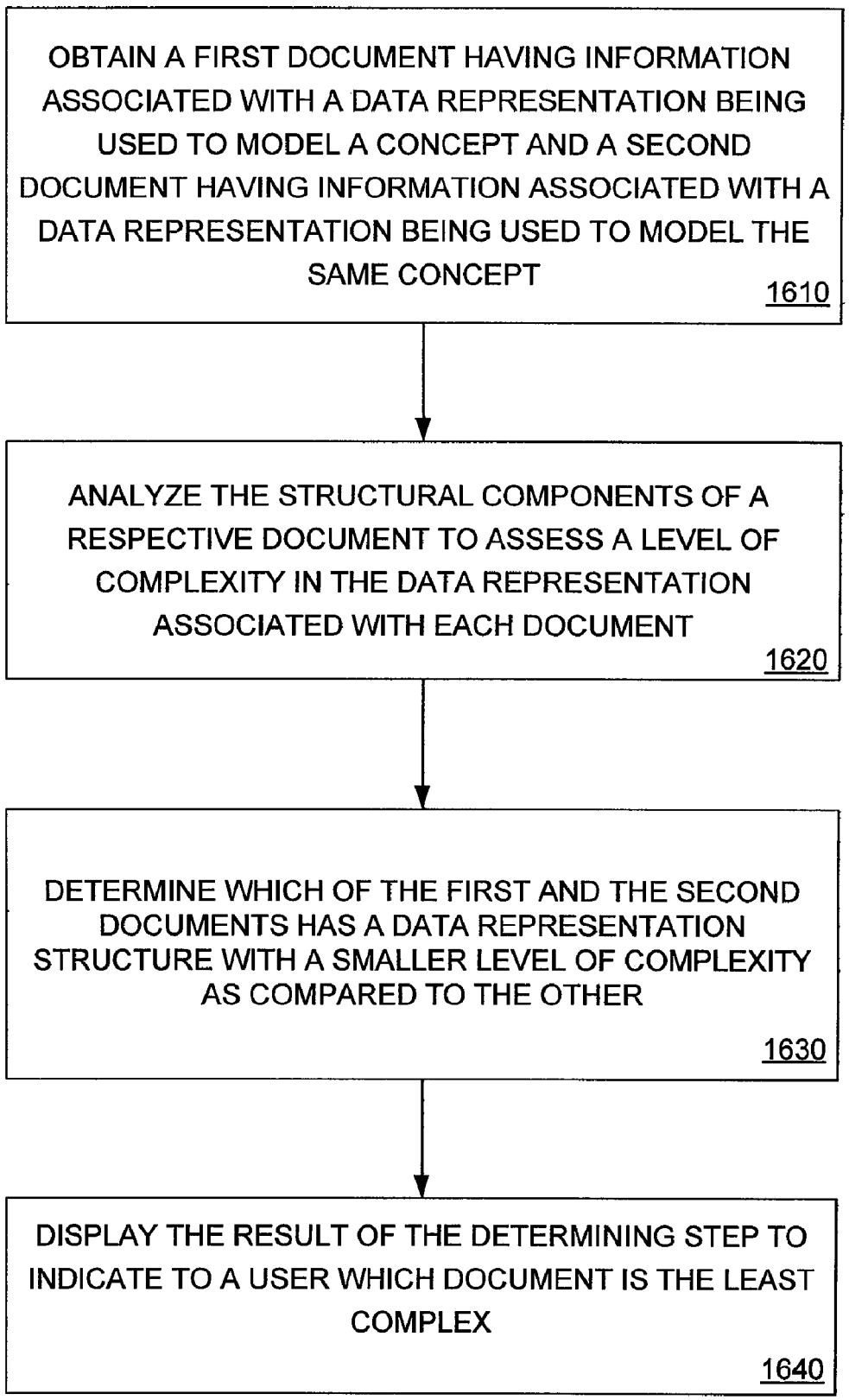
FIG. 16 is a flow chart describing one embodiment of a method for assessing complexity levels of data representations in accordance with the system of FIG. 1.

Referring now to FIG. 16, a flowchart describing one embodiment of a method for assessing complexity levels of data representations is shown. The method begins with obtaining (1610) a first document having information associated with a data representation being used to model a concept and a second document having information associated with a data representation being used to model the same concept. The structural components of a respective document are analyzed (1620) to assess a level of complexity in the data representation associated with each document. Further, the method includes the step of determining (1630) which of the first and second documents has a data representation structure with a smaller level of complexity as compared to the other. Accordingly, the result of the determining step is displayed (1640) to indicate to a user which document is the least complex.

Embodiments of the present disclosure can be implemented in hardware, software, firmware, or a combination thereof. If implemented in hardware, components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The evaluator program 110, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the present disclosure. All such modifications and variations are intended to be included herein within the scope of this disclosure.

Therefore, having thus described the invention, at least the following is claimed:

1. A system for assessing complexity levels of data representations, comprising:
    an evaluator module configured to obtain a document having information associated with a data representation being used to model a concept, the evaluator module further configured to analyze structural components of the data representation to compute a complexity score for the data representation,
    wherein the evaluator module prompts a user to provide individual element values for individual element objects contained in the data representation, individual attribute values for individual attribute objects contained in the data representation, and nesting values for nesting levels contained in the data representation, the evaluator module inputting the element values, the attribute values, and the nesting values received from the user in a table of values; and
    a storage medium having the table of values used to quantify the complexity level for each of the structural components of the data representation, the structural components comprising element objects and attribute objects, wherein the table of values includes the element values for the element objects, wherein the element objects comprise a first element object having a first element value in the table and a second element object having a second element value in the table that is different than the first element value, and the attribute values for the attribute objects that are used to compute the complexity score of the data representation, the table of values further comprising the nesting values to be assigned to nesting levels within the document, wherein the evaluator module aggregates the complexity levels of the structural components to determine the complexity score for the data representation, the determined complexity score of the data representation being impacted by the attribute values of the attribute objects of the data representation,
    wherein, to determine complexity levels of the structural components of the data representation, a customizable nesting value of a nesting level for each element object within the data representation is multiplied against an element value for the element object and the customizable nesting value of the nesting level for each attribute object within the data representation is multiplied against an attribute value for the attribute object.

2. The system of claim 1, the evaluator module further configured to display the complexity score for the data representation.

3. The system of claim 1, wherein a plurality of documents having data representations is used to model the same concept, the evaluator module further configured to determine which of the plurality of documents is the least complex representation of the concept.

4. The system of claim 1, wherein the data representation comprises an extensible markup language representation.

5. The system of claim 1, wherein the information associated with the data representation comprises a data schema for the data representation.

6. The system of claim 5, wherein the data schema describes rules for defining data in an extensible markup language environment.

7. A method for assessing complexity levels of data representations, comprising:
    a computer processor obtaining a first document having information associated with a first data representation being used to model a concept and a second document having information associated with a second data representation being used to model the same concept;
    the computer processor prompting a user to provide individual element values for individual element objects contained in the data representation, individual attribute values for individual attribute objects contained in the data representation, and nesting values for nesting levels contained in the data representation;
    the computer processor inputting the element values, the attribute values, and the nesting values received from the user in a table of values;
    the computer processor analyzing structural components of the first document and the second document to assess a complexity score for the first data representation associated with the first document and a complexity score for the second data representation associated with the second document, wherein nesting levels of structural components in a respective document being analyzed and individual values assigned to different types of structural components in the respective document being analyzed are factored into computing the complexity score for the respective document, a customizable nesting value assigned to a nesting level being multiplied against all of the individual values of the structural components residing at the nesting level, the complexity score of the respective document being impacted by an attribute structural component of the respective document; and the computer processor determining which of the first data representation of the first document and the second data representation of the second document has a smaller complexity score, wherein the structural components comprise element objects and attribute objects, the element objects comprising a first element object having a first individual element value and a second element object having a second individual element value that is different than the first individual element value, wherein, to determine the complexity score for the respective document, the customizable nesting value of a nesting level for each element object within a respective data representation is multiplied against an element value for the element object and the customizable nesting value of the nesting level for each attribute object within the respective data representation is multiplied against an attribute value for the attribute object to determine complexity levels of the structural components of the respective data representation, the complexity levels of the structural components being aggregated.

8. The method of claim 7, wherein the information associated with the data representations of the first document and the second document comprises an extensible markup language data representation.

9. The method of claim 7, wherein the information associated with the first data representation of the first document comprises a data schema for the first data representation.

10. The method of claim 9, wherein the data schema describes rules for defining data in an extensible markup language environment.

11. The method of claim 7, further comprising:
outputting a result indicating which of the first data representation of the first document and the second data representation of the second document has the smaller complexity score.

12. A computer readable storage medium having a computer program for assessing complexity levels of data representations, the program having instructions for performing:
obtaining a first document having information associated with a first data representation being used to model a concept and a second document having information associated with a second data representation being used to model the same concept;
prompting a user to provide individual element values for individual element objects contained in the data representation, individual attribute values for individual attribute objects contained in the data representation, and nesting values for nesting levels contained in the data representation;
inputting the element values, the attribute values, and the nesting values received from the user in a table of values;
analyzing structural components of the first document and the second document to assess a complexity score for the first data representation associated with the first document and a complexity score for the second data representation associated with the second document, wherein nesting levels of structural components in a respective document being analyzed and individual values assigned to different types of structural components in the respective document being analyzed are factored into computing the complexity score for the respective document, a customizable nesting value assigned to a nesting level being multiplied against all of the individual values of the structural components residing at the nesting level, the complexity score of the respective document being impacted by an attribute structural component of the respective document; and
determining which of the first data representation of the first document and the second data representation of the second document has a smaller complexity score,
wherein the structural components comprise element objects and attribute objects, the element objects comprising a first element object having a first individual element value and a second element object having a second individual element value that is different than the first individual element value,
wherein, to determine the complexity score for the respective document, the customizable nesting value of a nesting level for each element object within a respective data representation is multiplied against an element value for the element object and the customizable nesting value of the nesting level for each attribute object within the respective data representation is multiplied against an attribute value for the attribute object to determine complexity levels of the structural components of the data representation, the complexity levels of the structural components being aggregated.

13. The computer readable storage medium of claim 12, wherein the information associated with the data representations of the first document and the second document comprises an extensible markup language data representation.

14. The computer readable storage medium of claim 12, wherein the information associated with the first data representation of the first document comprises a data schema for the first data representation.

15. The computer readable storage medium of claim 12, the program further comprising:
outputting a result indicating which of the first data representation of the first document and the second data representation of the second document has the smaller complexity score.

* * * * *